United States Patent [19]

Kupf et al.

[11] 4,316,803

[45] Feb. 23, 1982

[54] FILTER SUPPORT OF PLATES FOR FILTER PRESSES

[75] Inventors: Lubomir Kupf, Prague; Radomil Adamék, Pardubice; Mirko Murséc, Pardubice, all of Czechoslovakia

[73] Assignee: Statni vyzkumny ustav materialu, Prague, Czechoslovakia

[21] Appl. No.: 143,011

[22] Filed: Apr. 23, 1980

[51] Int. Cl.³ .............................................. B01D 25/04
[52] U.S. Cl. ................................... 210/455; 210/229; 210/486
[58] Field of Search ............... 210/231, 455, 483, 486, 210/498, 499, 227–230, 541, 497.1

[56] References Cited

U.S. PATENT DOCUMENTS

| | | | |
|---|---|---|---|
| 2,813,632 | 11/1957 | Muller | 210/486 |
| 3,263,819 | 8/1966 | Schmidt et al. | 210/498 X |
| 3,295,687 | 1/1967 | Schmerler | 210/486 |
| 3,543,938 | 12/1970 | Busse et al. | 210/229 |
| 3,623,614 | 11/1971 | Schmidt | 210/486 |
| 3,960,730 | 6/1976 | Miller | 210/497.1 |
| 4,229,304 | 10/1980 | Fismer | 210/486 X |

*Primary Examiner*—Thomas G. Wyse

[57] ABSTRACT

A support for the plates of filter presses and filters for filtering over a filter wall, for instance over a filter cloth or filter paper. The support is provided with regularly oriented projections. The upper surfaces of the projections, which are in contact with the filter wall, are provided with grooves.

4 Claims, 4 Drawing Figures

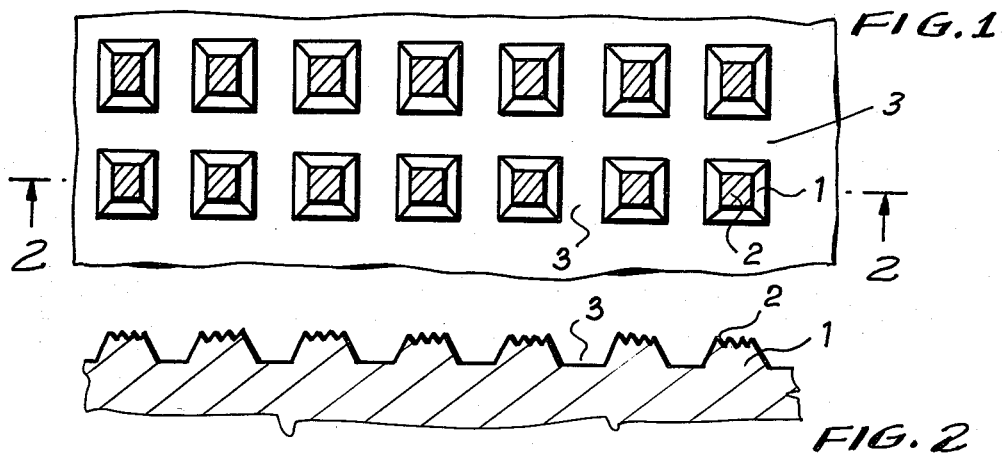
FIG. 1
FIG. 2
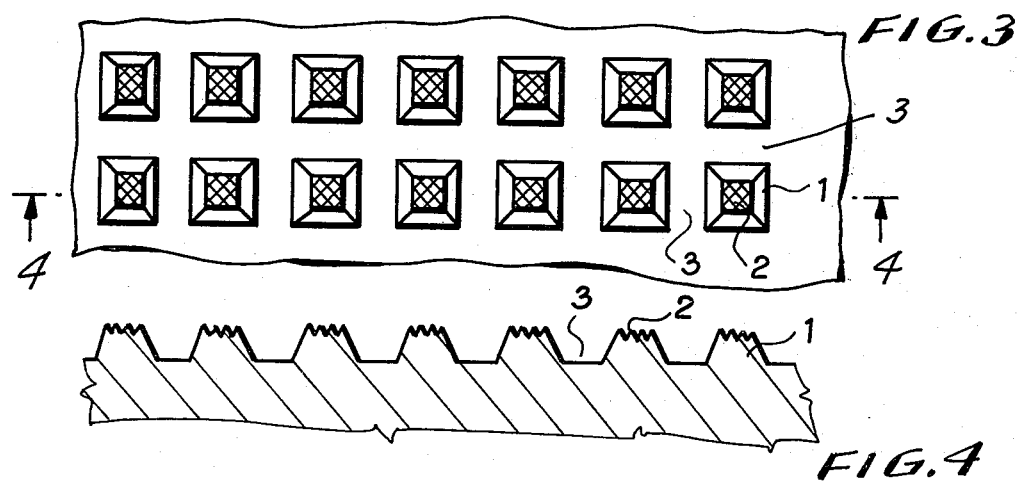
FIG. 3
FIG. 4

FILTER SUPPORT OF PLATES FOR FILTER PRESSES

BACKGROUND OF THE INVENTION

The invention relates to a support for the plates of filter presses and filters for filtering over a filter wall, for instance over a filter cloth or filter paper, which filter support is advantageously made of plastic material. The draining arrangement of the filter support of the invention comprises regularly oriented projections of geometric shapes.

At present, supports for the plates of filter presses and filters are different types of draining arrangements. As a draining arrangement, a system of projections supporting the filter wall and a system of channels serving for the removal of filtrates between said projections is employed. A commonly used draining arrangement uses vertical grooves at both sides of filter press plates, particularly wooden filter press plates and plates made of polypropylene. Some filter press plates made of plastic materials are also provided with inclined grooves, with cylindrical projections and projections in the shape of truncated pyramids. Another draining arrangement uses truncated pyramids with channels with two different depths for the removal of filtrates.

All of the above-mentioned draining arrangements have the common drawback that the surfaces of the projections on which the filter wall bears is smooth, flat or slightly convex, and the filter wall bears on this surface rather tightly due to the filter pressure. At places where the filter wall is in contact with the projections of the draining arrangement, the speed of filtration is reduced, such reduction being larger the thinner the filter wall is, and the larger the surface of the projections. Recently, thinner, hard and rather dense filter walls are used which are made of synthetic fibers. These walls are smoothed by calendering them from one or both sides in order to make them anti-adhesive to filter cakes. This kind of filter wall requires a particularly effective draining arrangement.

SUMMARY OF THE INVENTION

It is an object of this invention to provide a support for the plates of filter presses and filters for filtering over a filter cloth or filter paper, which passes the filtrate more uniformly over the whole filtering surface. The filter support according to this invention is provided with regularly oriented projections of geometric shapes, for instance cylinders, prisms, truncated pyramids or cones, the upper surfaces of which are flat or slightly convex, the upper surfaces of this draining arrangement, which are in contact with the filter wall, being provided with grooves.

The filter support according to this invention, with grooves upper surfaces of projections of the draining arrangement, permits a good removal of the filtrate even from places where the projections are in contact with the filter wall. The grooves can extend in one direction, or in two directions which are disposed at an acute or a right angle with respect to each other. It is possible to have the grooves made in directions which differ from the directions of the warp and weft of the filter cloth so that the individual fibers of the filter cloth obtain a better support.

DESCRIPTION OF DRAWING

Examplary embodiments of a filter support according to this invention are illustrated diagrammatically in the attached drawing, wherein:

FIG. 1 is a to view of a first embodiment of draining arrangement in accordance with the invention, the upper surface of which is provided with grooves extending in one direction;

FIG. 2 is a view in cross section taken along line 2—2 in FIG. 1;

FIG. 3 is a top view of a second embodiment of draining arrangement in accordance with the invention, the upper surface of which is provided with grooves extending in two directions; and FIG. 4 is a view in cross section taken along line 4—4 in FIG. 3.

DESCRIPTION OF PREFERRED EMBODIMENTS

The support for the plates of filter presses and filters according to FIGS. 1 and 2 is provided with regularly oriented projections 1 of the shape of truncated pyramids arranged in spaced parallel rows, with channels 3 between these projections, the channels extending at right angles with respect to each other. The pyramids in each row are disposed at a uniform distance from each other. The upper surface of the projections 1 of this draining arrangement of the filter support is provided with spaced parallel grooves 2 extending in one direction. The grooves 2 are at an angle of 45° with respect to the same one side of each pyramid. These projections 1 of the shape of a truncated pyramid have dimensions of 8×8 mm, a height of 4 mm, the grooves 2 are 0.5 mm wide, and are 0.5 mm deep. The channels 3 have a depth of 4 mm and a width of 6 mm.

The support for the plates of filter presses and filters according to FIGS. 3 and 4 also has regularly oriented projections 1, with channels 3 between these projections 1, the projections being disposed in the same manner as in FIGS. 1 and 2. The upper surface of the draining arrangement of the filter support, which is in contact with the filter wall has two sets of grooves 2 extending in two different directions. In the illustrative embodiment the grooves 2 in the two sets through extending at right angles to each other and at 45°, in reverse directions, with respect to the channels 3. The dimensions of grooves 2, of channels 3 and projections 1 of the draining arrangement are the same as in FIG. 1.

Although the invention is illustrated and described with reference to a plurality of preferred embodiments thereof, it is to be expressly understood that it is in no way limited to the disclosure of such preferred embodiments, but is capable of numerous modifications within the scope for the appended claims.

We claim:

1. A filter support for a plate for filter presses and filters for filtering over a filter wall the plate provided with regularly oriented projections of geometric shape, the upper surfaces of said projections, which are in contact with the filter wall, being provided with grooves.

2. The filter support according to claim 1, wherein the grooves are parallel.

3. The filter support according to claim 2, wherein the grooves extend in only one direction.

4. The filter support according to claim 2, wherein there are two sets of parallel grooves, the grooves of one set extending at a substantial angle with respect to the grooves of the other set.

* * * * *